US009037386B2

(12) United States Patent
Kawakami et al.

(10) Patent No.: US 9,037,386 B2
(45) Date of Patent: May 19, 2015

(54) SENSOR SIGNAL PROCESSING DEVICE

(71) Applicant: DENSO CORPORATION, Kariya, Aichi-pref. (JP)

(72) Inventors: Daisuke Kawakami, Anjo (JP); Akito Itou, Kariya (JP); Ryotaro Kuno, Ichinomiya (JP)

(73) Assignee: DENSO CORPORATION, Kariya (JP)

( * ) Notice: Subject to any disclaimer, the term of this patent is extended or adjusted under 35 U.S.C. 154(b) by 456 days.

(21) Appl. No.: 13/653,500

(22) Filed: Oct. 17, 2012

(65) Prior Publication Data

US 2013/0096812 A1 Apr. 18, 2013

(30) Foreign Application Priority Data

Oct. 18, 2011 (JP) ................................ 2011-228829

(51) Int. Cl.
*G06F 19/00* (2011.01)
*F02D 41/28* (2006.01)
*F02D 41/00* (2006.01)
*F02D 41/14* (2006.01)

(52) U.S. Cl.
CPC ................ *G06F 19/00* (2013.01); *F02D 41/28* (2013.01); *F02D 2250/14* (2013.01); *F02D 41/009* (2013.01); *F02D 2041/1432* (2013.01); *F02D 2041/281* (2013.01)

(58) Field of Classification Search
CPC ..... F02D 35/027; F01L 22/221; F01L 22/226
USPC .................. 701/111, 114, 115, 102; 123/478, 123/406.37, 406.38, 406.39; 73/35.04, 73/35.12
See application file for complete search history.

(56) References Cited

U.S. PATENT DOCUMENTS

| | | | | |
|---|---|---|---|---|
| 4,482,962 | A * | 11/1984 | Amano et al. | 701/114 |
| 5,113,833 | A * | 5/1992 | Nagano et al. | 123/491 |
| 2004/0230347 | A1 | 11/2004 | Sakurai et al. | |
| 2005/0166665 | A1* | 8/2005 | Honda | 73/35.12 |
| 2007/0067090 | A1* | 3/2007 | Hashimoto et al. | 701/111 |
| 2007/0175268 | A1 | 8/2007 | Honda | |
| 2008/0059045 | A1 | 3/2008 | Nakagawa et al. | |
| 2008/0167793 | A1 | 7/2008 | Kaneko et al. | |

FOREIGN PATENT DOCUMENTS

| | | |
|---|---|---|
| JP | 2-259258 | 10/1990 |
| JP | 5-141335 | 6/1993 |
| JP | 8-84377 | 6/1996 |
| JP | 11-190250 | 7/1999 |
| JP | 2000-054907 | 2/2000 |

(Continued)

*Primary Examiner* — John Kwon
(74) *Attorney, Agent, or Firm* — Nixon & Vanderhye PC

(57) ABSTRACT

A sensor signal processing device includes an AD conversion section, a filter section, a timing signal generation section, and an arithmetic section. The timing signal generation section generates a signal synchronized with a crank angle of an engine based on a signal indicating the crank angle and generates a data acquisition timing signal by compensating the signal synchronized with the crank angle with a delay time of the filter. The arithmetic section acquires a plurality of sensor signals, which is transmitted from a sensor, converted from an analog signal to a digital signal by the AD conversion section, and filtered by the filter section, in a term before and after receiving the data acquisition timing signal and generates a data synchronized with the data acquisition timing signal.

16 Claims, 5 Drawing Sheets

(56) References Cited

FOREIGN PATENT DOCUMENTS

| | | |
|---|---|---|
| JP | 2001-263153 | 9/2001 |
| JP | 2003-87098 | 3/2003 |
| JP | 2004-150279 | 5/2004 |
| JP | 2004-197579 | 7/2004 |
| JP | 2004-339977 | 12/2004 |
| JP | 2005-105882 | 4/2005 |
| JP | 2005-220796 | 8/2005 |
| JP | 2006-330827 | 12/2006 |
| JP | 2007-198305 | 8/2007 |
| JP | 2008-169728 | 7/2008 |

* cited by examiner

SENSOR SIGNAL PROCESSING DEVICE

CROSS REFERENCE TO RELATED APPLICATIONS

The present application is based on and claims priority to Japanese Patent Application No. 2011-228829 filed on Oct. 18, 2011, the contents of which are incorporated in their entirety herein by reference.

TECHNICAL FIELD

The present disclosure relates to a sensor signal processing device for controlling an engine.

BACKGROUND

Conventionally, noise is superimposed on a sensor signal for controlling an engine. Thus, a filter for removing the noise is required for acquiring an accurate sensor signal. However, when a filtering process is performed for removing noise, a delay time due to the filtering process (hereafter, a filer delay time) is generated. JP-A-2008-169728 (corresponding to US 2008/0167793 A and referred to as a patent document No. 1) discloses a method of compensating the filter delay time.

In the method of compensating the filter delay time disclosed in the patent document No. 1, all data passing through a digital filter in a predetermined section is stored in a random access memory (RAM). Then, the stored data is processed with another digital filter from a last stored data to a first stored data in order. Accordingly, a digital filter delay time can be compensated.

In a conventional internal combustion engine for a vehicle, an engine control depending on a crank angle is performed and it is required for acquiring an accurate sensor signal synchronized with the crank angle. However, because a filtering process for removing noise is required, a filer delay time is generated. JP-A-2005-220796 (corresponding to US 2005/0166665 A and referred to as a patent document No. 2) discloses a method of compensating the filter delay time.

In the method disclosed in the patent document No. 2, a sensor signal and a counter value of the crank angle at the point are detected, and the sensor signal and the counter value are stored in a memory so as to correspond to each other. Accordingly, a sensor signal corresponding to any crank angle can be acquired.

However, the methods disclosed in the patent document No. 1 and the patent document No. 2 have the following difficulties. In the method disclosed in the patent document No. 1, a huge amount of data passing through the digital filter in the predetermined section is once stored in the RAM and the filter delay is compensated by processing the stored data with the digital filter from the last stored data to the first stored data in order. Because the huge amount of data has to be stored in the RAM, a storage capacity of the RAM is huge and a cost increases.

In the method disclosed in the patent document No. 2, a sensor signal is AD converted at predetermined intervals (e.g., 10 μsec). Thus, a timing of a desired crank angle is less likely to correspond to a timing of the AD conversion, and an accurate data synchronized with the crank angle may not be acquired.

SUMMARY

It is an object of the present disclosure to provide a sensor signal processing device that can obtain a sensor signal synchronized with any crank angle and can reduce a required storage capacity.

A sensor signal processing device according to an aspect of the present disclosure includes an AD conversion section, a filter section, a timing signal generation section, and an arithmetic section. The AD conversion section converts an analog signal to a digital sensor signal. The filter section filters a signal. The timing signal generation section generates a signal synchronized with a crank angle of an engine based on a signal indicating the crank angle and generates a data acquisition timing signal by compensating the signal synchronized with the crank angle with a delay time of the filter. The arithmetic section acquires a plurality of sensor signals, which is transmitted from a sensor, converted to the digital signal by the AD conversion section, and filtered by the filter section, in a term before and after receiving the data acquisition timing signal and generates a data synchronized with the data acquisition timing signal.

BRIEF DESCRIPTION OF THE DRAWINGS

Additional objects and advantages of the present disclosure will be more readily apparent from the following detailed description when taken together with the accompanying drawings. In the drawings.

DETAILED DESCRIPTION (First Embodiment)

Figure 1:
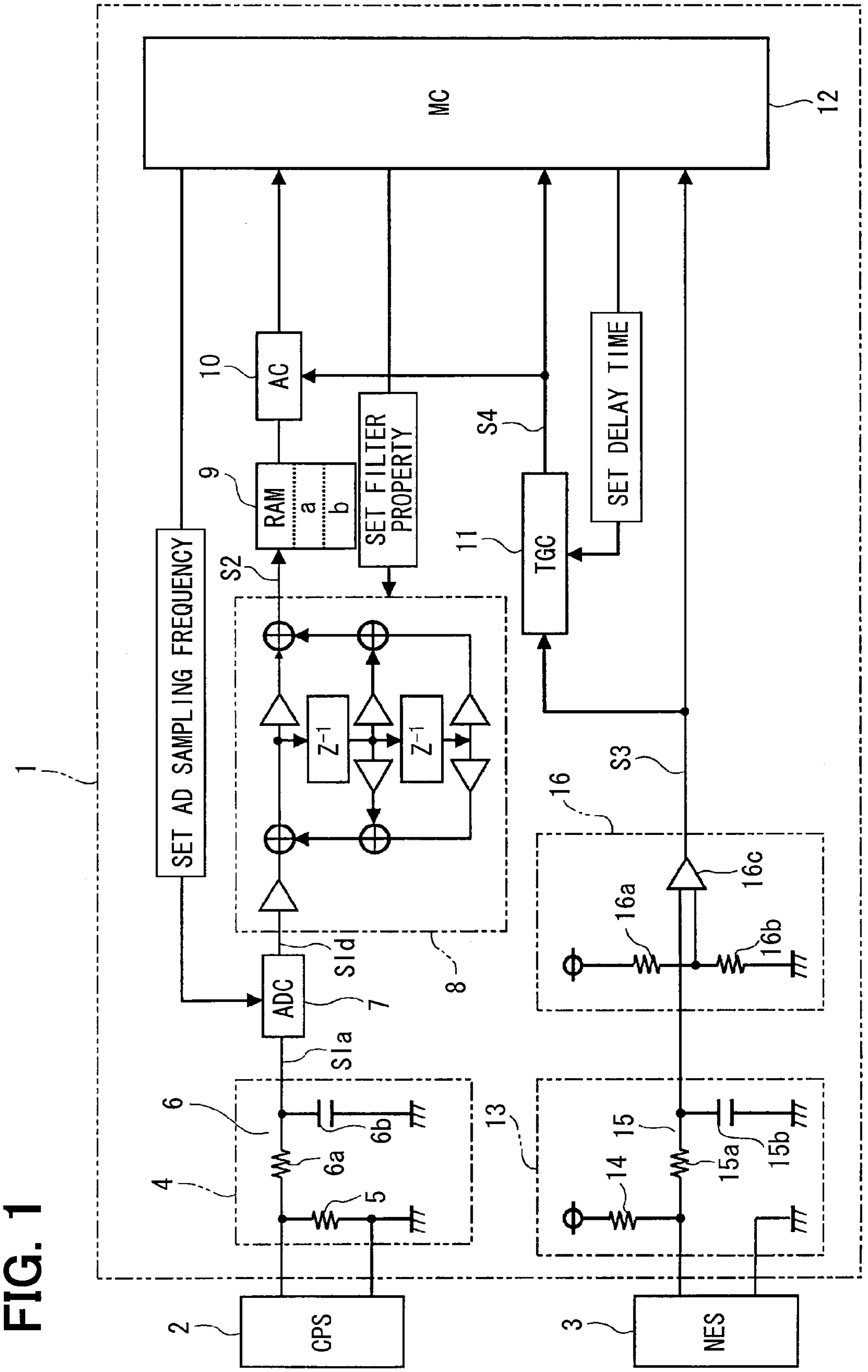
FIG. 1 is a diagram showing a sensor signal processing device 1 according to a first embodiment of the present disclosure.

A sensor signal processing device 1 according to a first embodiment of the present disclosure will be described with reference to FIG. 1 to FIG. 5. The sensor signal processing device 1 is coupled with a cylinder pressure sensor (CPS) 2 and an NE (number of speed) sensor 3 which is referred to as NES in the drawings. The CPS 2 detects a pressure in a cylinder of an engine. The NE sensor 3 outputs a detection signal in accordance with a crank angle.

The CPS 2 detects the pressure in the cylinder of the engine and transmits a sensor signal in accordance with the pressure. The sensor signal is transmitted to an input circuit 4 in the sensor signal processing device 1. The input circuit 4 includes a resistor 5 for fixing a phase and an anti-aliasing filter 6. The anti-aliasing filter 6 includes a resistor 6*a* and a capacitor 6*b*.

Figure 4:
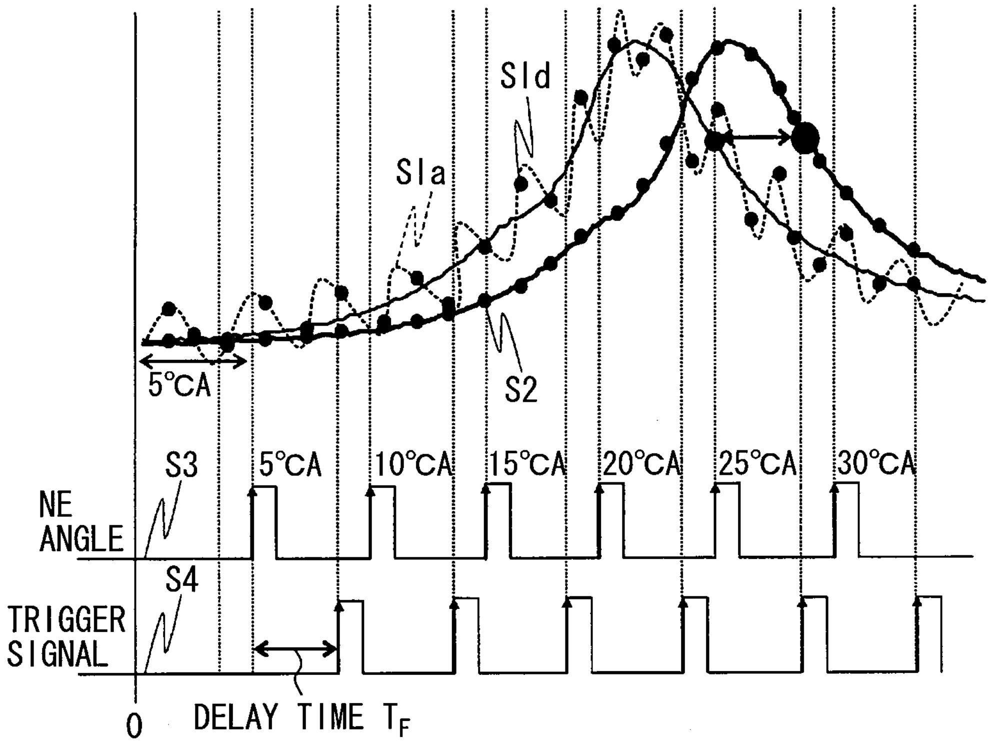
FIG. 4 is a diagram showing waveforms of signals generated at various parts in the sensor signal processing device.

The input circuit 4 transmits an analog sensor signal S1*a*, which is shown by a dashed curve line in FIG. 4. The analog sensor signal S1*a* is sampled with a predetermined sampling period ($T_{ADC}$) by an AD conversion circuit (ADC) 7. The AD conversion circuit 7 can operate as an AD conversion section. The AD conversion circuit 7 converts the analog sensor signal S1*a* to a digital sensor signal S1*b*, which is shown by black points on the curved line of the analog sensor signal S1*a*, and transmits the digital sensor signal S1*b* to a digital filter 8. An unnecessary signal component (noise) is superimposed on the digital sensor signal S1*d*, which is AD converted with the sampling period $T_{ADC}$. Thus, the digital filter 8 performs a filtering process for removing the noise and transmits a digital sensor signal S2 from which the noise is removed. The digital filter 8 can operate as a filter section. The digital sensor signal S2 is shown by black points on a bold curved line in FIG. 4. The digital sensor signal S2 delays by a delay time of the digital filter 8 with respect to a phase of the analog sensor signal S1*a*.

Figure 3:
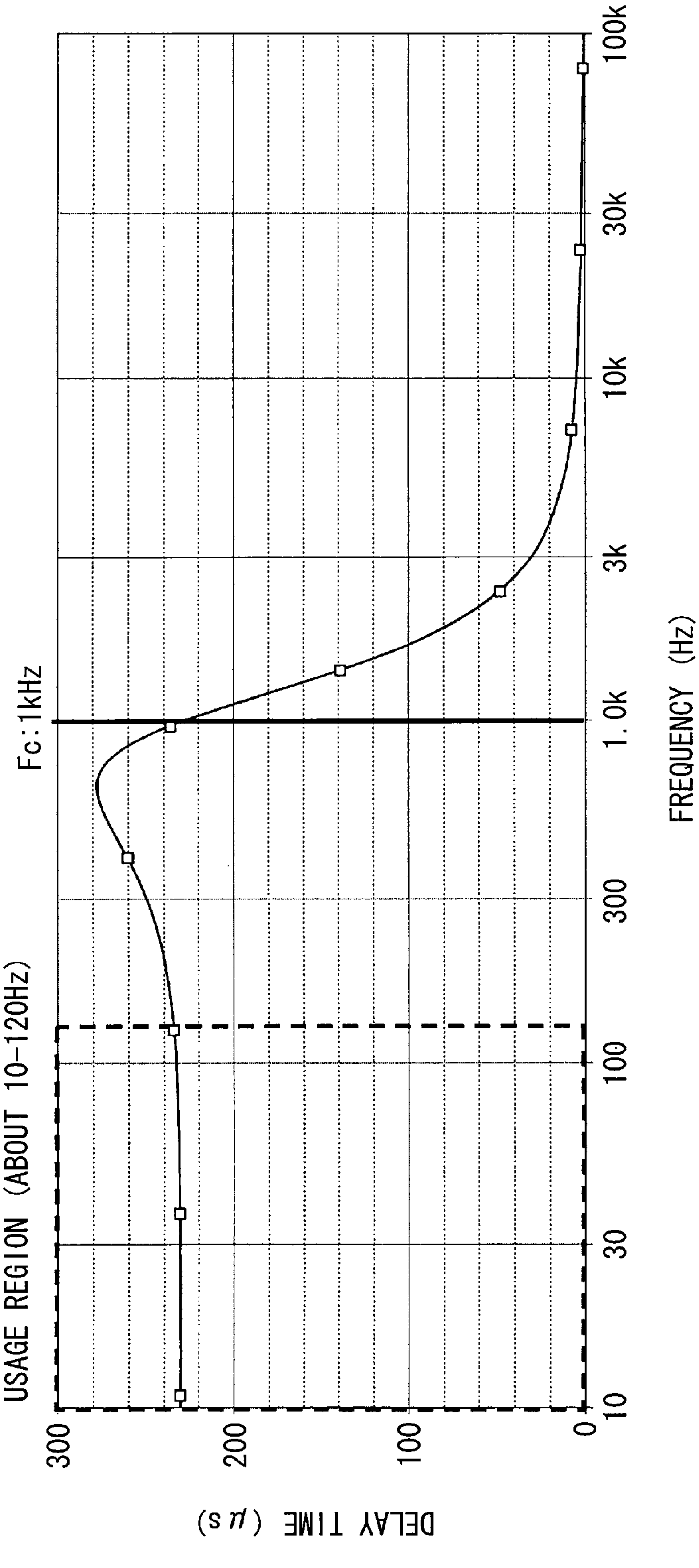
FIG. 3 is a graph showing a relationship between a frequency and a delay time of a filter.

The digital filter 8 is an active second-order low pass filter. The digital filter 8 has a cut-off frequency Fc of 1 kHz, and group delay characteristics have frequency characteristic as shown in FIG. 3. In addition, the digital filter 8 is configured so that a passing time of a frequency component has substantially the same delay time in a range from 0 Hz to 120 Hz as shown in FIG. 3. Because a using frequency zone of the sensor signal is about 10 Hz to 120 Hz, the sensor signal passes with a constant delay time regardless of the frequency. Thus, the sensor signal shifts by the delay time in a time axis, and a distortion of a waveform is hardly generated.

The digital sensor signal S2 is transmitted from the digital filter 8 to a RAM 9 that can operate as a storage section. The RAM 9 includes two data storage areas RAMa and RAMb. Each time the RAM 9 receives the digital sensor signal S2, the digital sensor signal S2 is stored in the RAMa and a data value stored in the RAMa is transmitted to the RAMb. In addition, the data value stored in the RAMb is deleted. Accordingly, the latest two data values are always stored in the RAM 9.

An arithmetic circuit (AC) 10 acquires the sensor signal stored in the RAM 9 at a timing based on a trigger signal transmitted from a trigger generation circuit (TGC) 11. The trigger generation circuit 11 can operate as a timing signal generation section. The arithmetic circuit 10 carries out a compensation process to the digital sensor signal, operates the sensor signal at the timing of the trigger signal, and transmits an operation result to a microcomputer (MC) 12. The RAM 9 and the arithmetic circuit 10 can operate as an arithmetic section.

The trigger generation circuit 11 generates the trigger signal, which is a data acquisition timing signal, based on the detection signal of the NE sensor 3. The NE sensor 3 transmits the detection signal in accordance with the crank angle of the engine. For example, the NE sensor 3 transmits the detecting signal having a pulse that rises with respect to each crank angle 5° CA. The detection signal is transmitted to the input circuit 13 of the sensor signal processing device 1. The input circuit 13 includes a resistor 14 for fixing a phase and an analog filter 15 for removing noise. The analog filter 15 includes a resistor 15*a* and a capacitor 15*b*.

The detection signal whose noise is removed by the input circuit 13 is transmitted to a waveform shaping circuit 16. The waveform shaping circuit 16 performs waveform shaping of the detection signal and transmits a pulse signal S3 (pulse signal shown as NE angle in FIG. 4) synchronized with the crank angle. The waveform shaping circuit 16 includes resistors 16*a*, 16*b* that generate a reference voltages and a comparator 16*c* that transmits a comparison result with the reference voltage as a waveform-shaped signal. The trigger generation circuit 11 receives the signal S3 from the waveform shaping circuit 16. The trigger generation circuit 11 starts to count a time on the basis of a rising edge of the waveform of the signal S3. The trigger generation circuit 11 generates a trigger signal S4 (pulse signal shown as trigger signal in FIG. 4) which has a rising edge after a delay time $T_F$ of the digital filter 8. The trigger generation circuit 11 transmits the trigger signal as the data acquisition timing signal to the arithmetic circuit 10 and the microcomputer 12. In this case, data of the delay time $T_F$ of the digital filter 8 can be obtained from data set by the microcomputer 12.

The microcomputer 12 can set an AD sampling period (sampling frequency) with respect to the AD conversion circuit 7. In addition, the microcomputer 12 sets a filter property to the digital filter 8 and sets the delay time $T_F$ of the digital filter 8 to the trigger generation circuit 11.

Figure 2:
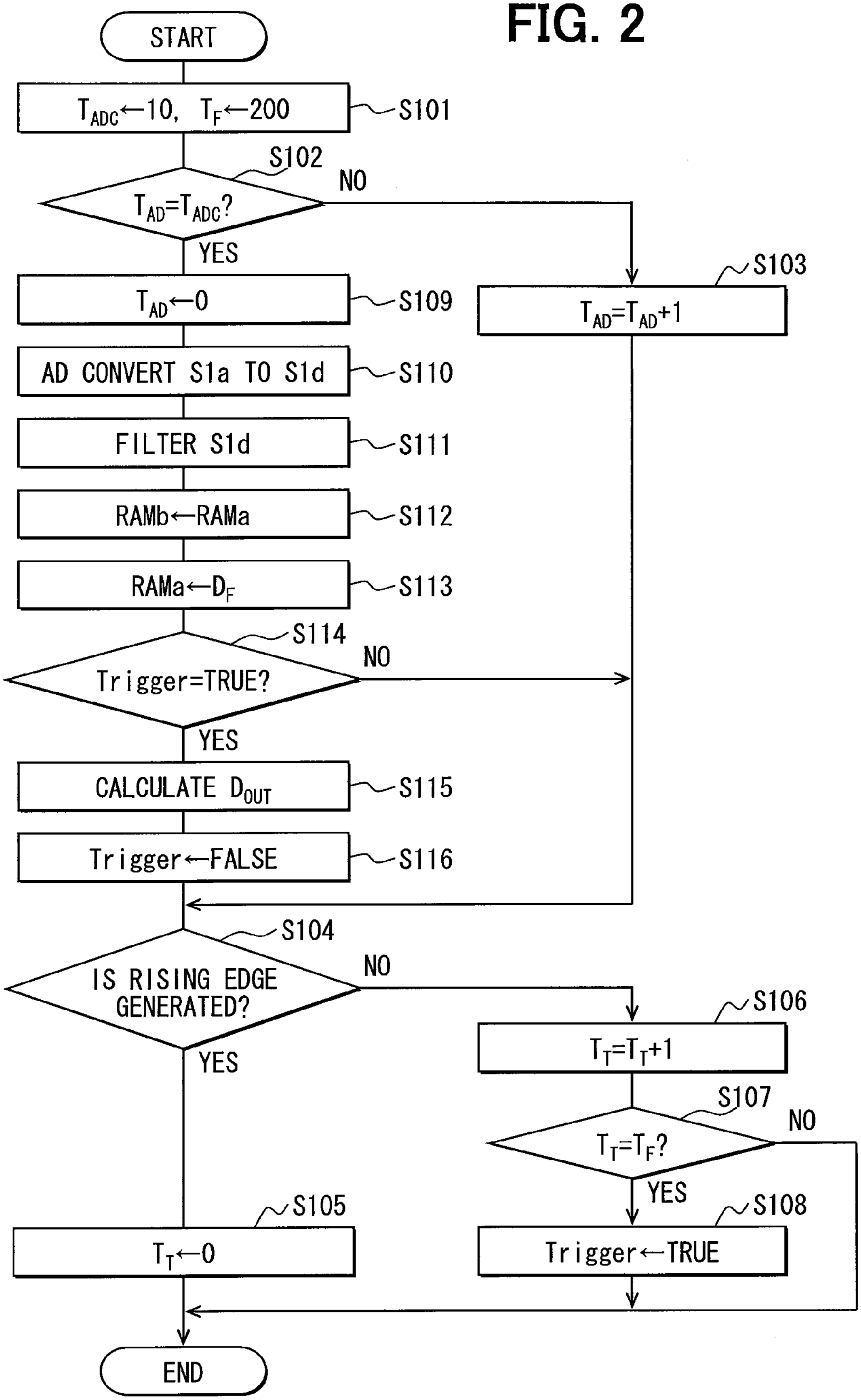
FIG. 2 is a flowchart showing a CPS signal process routine.

In the sensor signal processing device 1, the arithmetic circuit 10 synchronizes the sensor signal of the CPS 2 to generate a signal synchronized with the crank angle, and transmits the signal to the microcomputer 12 in line with a process described below with reference to FIG. 2. The sensor signal processing device 1 carries out the process, for example, each 1 μsec.

At S101, the sensor signal processing device 1 sets the sampling period $T_{ADG}$ of the AD conversion of the AD conversion circuit 7 to, for example, 10 μsec. In addition, the sensor signal processing device 1 sets the delay time $T_F$ of the digital filter 8 to, for example, 200 μsec. The delay time $T_F$ may include a delay time at passing the AD conversion circuit 7 or a delay time at other circuit as necessary in addition to the delay time of the digital filter 8. At S102, the sensor signal processing device 1 determines whether the count value $T_{AD}$ reaches the time $T_{ADC}$ to perform the AD conversion. When the count value $T_{AD}$ does not reaches the time $T_{ADC}$ (=10), which corresponds to "NO" at S102, the sensor signal processing device 1 adds "1" to the count value $T_{AD}$ at S103.

At S104, the sensor signal processing device 1 determines whether a waveform rising edge is generated in the detection signal S3 of the NE sensor 3. For example, the sensor signal processing device 1 determines whether the signal S3 transmitted from the NE sensor 3 to the trigger generation circuit 11 via the input circuit 13 has a new rising edge. When the waveform rising edge is generated in the detection signal S3 of the NE sensor 3, which corresponds to "YES" at S104, the process proceeds to S105. At S105, a delay time count value $T_T$ is reset, that is, "0" is substituted, and the sensor signal processing device 1 ends the process.

When the waveform rising edge is not generated in the detection signal S3 of the NE sensor 3, which corresponds to "NO" at S104, the process proceeds to S106. At S106, the sensor signal processing device 1 adds "1" to the delay time count value $T_T$. At S107, the sensor signal processing device 1 determines whether the delay time count value $T_T$ reaches the filter delay time $T_F$ (=200). When the delay time count value $T_T$ does not reach the filter delay time $T_F$, which corresponds to "NO" at S107, the sensor signal processing device 1 ends the process. When the delay time count value $T_T$ reaches the filter delay time $T_F$, which corresponds to "YES" at S107, the process proceeds to S108. At S108, the sensor signal processing device 1 sets a trigger flag to "TRUE" so that a trigger waveform rising edge is generated. Then, the sensor signal processing device 1 ends the process.

As described above, the sensor signal processing device 1 carries out (i) the process from S101 to S105, (ii) the process from S101 to S104, S106, and S107, or (iii) the process from S101 to S104 and from S106 to S108. When the count value $T_{AD}$ reaches $T_{ADC}$ in the process of (ii) after the process of (i) and before the process of (iii), which corresponds to "YES" at S102, it is a time to AD convert. Thus, the process proceeds to S109, and the sensor signal processing device 1 clears the count value $T_{AD}$, that is, "0" is substituted. At S110, the analog sensor signal S1*a* transmitted from the CPS 2 via the input circuit 4 is converted by the AD conversion circuit 7 into the digital sensor signal Sid. Then, at S111, the digital sensor signal S1*d* is treated with the filtering process by the digital filter 8, and the sensor signal S2 is generated.

At S112, the RAM 9 stores the data value that is stored in the RAMa in the RAMb. At S113, the RAM 9 stores data value $D_F$, which is obtained from the signal S2 transmitted from the digital filter 8 in the RAMa. Then, at S114, the sensor signal processing device 1 determines whether the trigger waveform rising edge is generated (Trigger=TRUE). When the rising edge has not been generated, which corresponds to "NO" at S114, the process proceeds to S104. After that, the process S104, S106, and S107 are carried out and the process ends.

For each predetermined time (1 μsec), the process of (ii), that is, the process from S101 to S104, S106, and S107 is carried out, and when the count value $T_{AD}$ reaches the time $T_{ADC}$ to AD convert, which corresponds to "YES" at S102, the process from S109 to S104 is carried out. Because the data values in the RAMa, RAMb are updated successively, the latest two data values are always stored.

When the value of the delay time count value $T_T$ reaches $T_F$ (=200) in repetition of the above-described process, which corresponds to S107, the process proceeds to S108. At S108, the sensor signal processing device 1 substitutes "TRUE" in the trigger flag to generate the trigger waveform rising edge. Then, the sensor signal processing device 1 ends the process. Accordingly, the trigger signal S4 is transmitted from the trigger generation circuit 11 to the arithmetic circuit 10 and the microcomputer 12.

After that, when the process is restarted, the process from S101 to S104, S106, and S107 is repeated. When the next AD conversion time comes ($T_{AD}$=$T_{ADC}$), which corresponds to "YES" at S102, the process from S109 to S113 is carried out. Then, the sensor signal processing device 1 determines that the trigger waveform rising edge is generated (Trigger=TRUE), which corresponds to S114, and the process proceeds to S115.

At S115, the arithmetic circuit 10 calculates output data value $D_{OUT}$. A data value $D_n$ that is generated at the sampling time $T_{ADC}$ after the time $T_{AD}$ at which the trigger waveform rising edge is generated is stored in the RAMa in the RAM 9. A data value $D_{n-1}$ that is generated at the sampling time $T_0$ (=0) before the time $T_{AD}$ is stored in the RAMb. Thus, the arithmetic circuit 10 can approximately calculate a data value $D_3$ at the time $T_{AD}$ by a linearly interpolation using the data values $D_{n-1}$, $D_n$.

Figure 5:
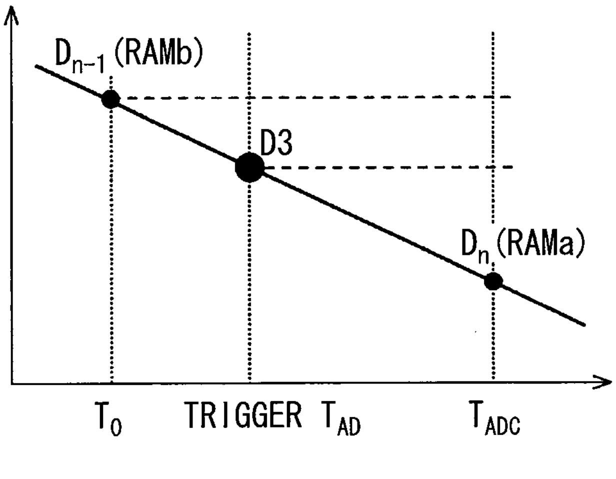
FIG. 5 is a diagram for explaining a liner interpolation process.

The linear interpolation by the arithmetic circuit 10 will be described with reference to FIG. 5. It is assumed that data values between the data values $D_{n-1}$ and $D_n$ change linearly, and a slop Z between the data values $D_{n-1}$ and $D_n$ is calculated using the following equation. Then, the data value $D_3$ at the time $T_{AD}$ is calculated by adding the product of the time $T_{AD}$ and the slope Z to the data value $D_{n-1}$ at the time $T_0$ (=0) stored in the RAMb.

$$Z = (RAMa - RAMb) / T_{ADC}$$

$$\begin{aligned} D_3 &= RAMb + T_{AD} \times Z \\ &= RAMb + T_{AD} \times (RAMa - RAMb) / T_{ADC} \\ &= (T_{ADC} \times RAMb - T_{AD} \times RAMb + T_{AD} \times RAMa) / T_{ADC} \end{aligned}$$

The arithmetic circuit 10 transmits the calculation result of the data value $D_3$ as the output data value $D_{OUT}$ to the microcomputer 12. Accordingly, the value of the sensor signal corresponding to the crank angle at the time $T_{AD}$ at which the trigger waveform rising edge is generated can be calculated as the output data value $D_{OUT}$.

After that, the sensor signal processing device 1 sets "FALSE" to the trigger flag at S116. At S104, the sensor signal processing device 1 determines whether the NE waveform rising edge is generated. When the NE waveform rising edge is generated, which corresponds to "YES" at S104, the sensor signal processing device 1 clears the count value $T_T$ and ends the process. When the NE waveform rising edge is not generated, which corresponds to "NO" at S104, the sensor signal processing device 1 adds "1" to the count value $T_T$ at S106. Then, the sensor signal processing device 1 determines whether the count value $T_T$ reaches the filer delay time $T_F$ at S107 and ends the process.

After that, the sensor signal processing device 1 repeats the above-described process. Accordingly, each time the trigger waveform rising edge is generated, the sensor signal processing device 1 calculates the value of the sensor signal corresponding to the crank angle at the time $T_{AD}$ at which the trigger waveform rising edge is generated as the output value $D_{OUT}$ using the data values stored in the RAM 9, and the microcomputer 12 acquires the output value $D_{OUT}$.

In cases where intervals of the waveform rising edges of the detection signal S3 of the NE sensor 3 are shorter than the delay time $T_F$, the count value $T_T$ may be stored when the count value $T_T$ is reset ($T_T$=0), and the trigger waveform rising edge may be generated based on the sum of the count values of a plurality of times.

According to the present embodiment, the sensor signal processing device 1 converts the sensor signal of the CPS 2 to the digital signal at intervals of 10 μsec. The digital filter 8 removes noise from the digital signal to generate the signal S2 having the data value $D_F$. The data value stored in the RAMa is moved to the RAMb and a new data value is stored in the RAMa. Then, the arithmetic circuit 10 calculates the data value $D_3$, which corresponds to the crank angle at the time when the trigger waveform rising edge is generated, by the linear compensation based on the count value $T_{AD}$ of the AD conversion counter at which the trigger waveform rising edge is generated, the data values $D_n$, $D_{n-1}$ stored in the RAMa, RAMb before and after the trigger waveform rising edge is generated. Thus, the RAM 9 is required to have a storage content only for two data values in the RAMa and RAMb, and a cost of the RAM 9 can be low. In addition, because the data value $D_3$ corresponding to the crank angle can be calculated with linear compensation, an accurate data value can be obtained rapidly.

The sampling period of the AD conversion is set to 10 μsec and the process is carried out 10 times in one period to detect the trigger waveform rising edge. Thus, 1 μs, that is, the time between the two AD converted signals is divided by 10, and the data value corresponding to the generation of the trigger waveform rising edge can be calculated with the linear compensation with a high degree of accuracy.

The trigger generation circuit 11 generates the trigger signal S4 to generate the rising edge at the data acquisition timing obtained by adding the delay time of the digital filter 8 to the timing of the generation of the waveform rising edge of the detection signal S3 of the NE sensor 3. Thus, the timing signal for compensating the filter delay can be generated with a simple configuration.

The frequency delay characteristic is set so that the delay time is constant in the frequency zone from 10 Hz to 120 Hz with which the sensor signal of the CPS 2 is acquired. Thus, a distortion in the waveform of the sensor signal passing through the digital filter 8 can be reduced, and a phase delay compensation is accurately performed by shifting by the constant delay time $T_F$ in the time axis.

When the delay time $T_F$ of the trigger generation circuit 11 is set, the delay time of the AD conversion circuit 7 or the delay time of other circuit is included in addition to the delay time of the digital filter 8. Thus, as a whole, the data value corresponding to the crank angle can be acquired at an accurate timing.

The filter property of the digital filter 8 can be set and changed by the microcomputer 12. Thus, when the filter property changes, when the filter is exchanged, or the when the filter property is initially set, the microcomputer 12 can set the filter property flexibly. Accordingly, the sensor signal processing device 1 can acquire more accurate data value.

The sensor signal processing device 1 includes the waveform shaping circuit 16, and the waveform of the detection signal of the NE sensor 3 transmitted via the input circuit 13 is shaped. Thus, the signal S3 synchronized with the crank angle can be transmitted at an accurate generation time, and the accurate data value can be acquired by calculation.

The sampling period of the AD conversion circuit 7 can be set and changed by the microcomputer 12. Thus, the sampling period can be appropriately set in accordance with characteristics of the sensor signal and noisy environment, and the data value can be calculated accurately and rapidly.

The waveform shaping circuit 16 transmits the signal S3 to the microcomputer 12 and the trigger generation circuit 11 transmits the trigger signal S4 to the microcomputer 12. Thus, the microcomputer 12 can measure the delay time by comparing the crank angle and the signal after the delay time is added, the microcomputer 12 can confirm whether the detection signal S3 synchronized with the crank angle and the trigger signal generated in synchronization with the crank angle can be normally transmitted. In other words, the microcomputer 12 can detect a generation of abnormality in the signal S3 and the trigger signal S4.

(Second Embodiment)

Figure 6:
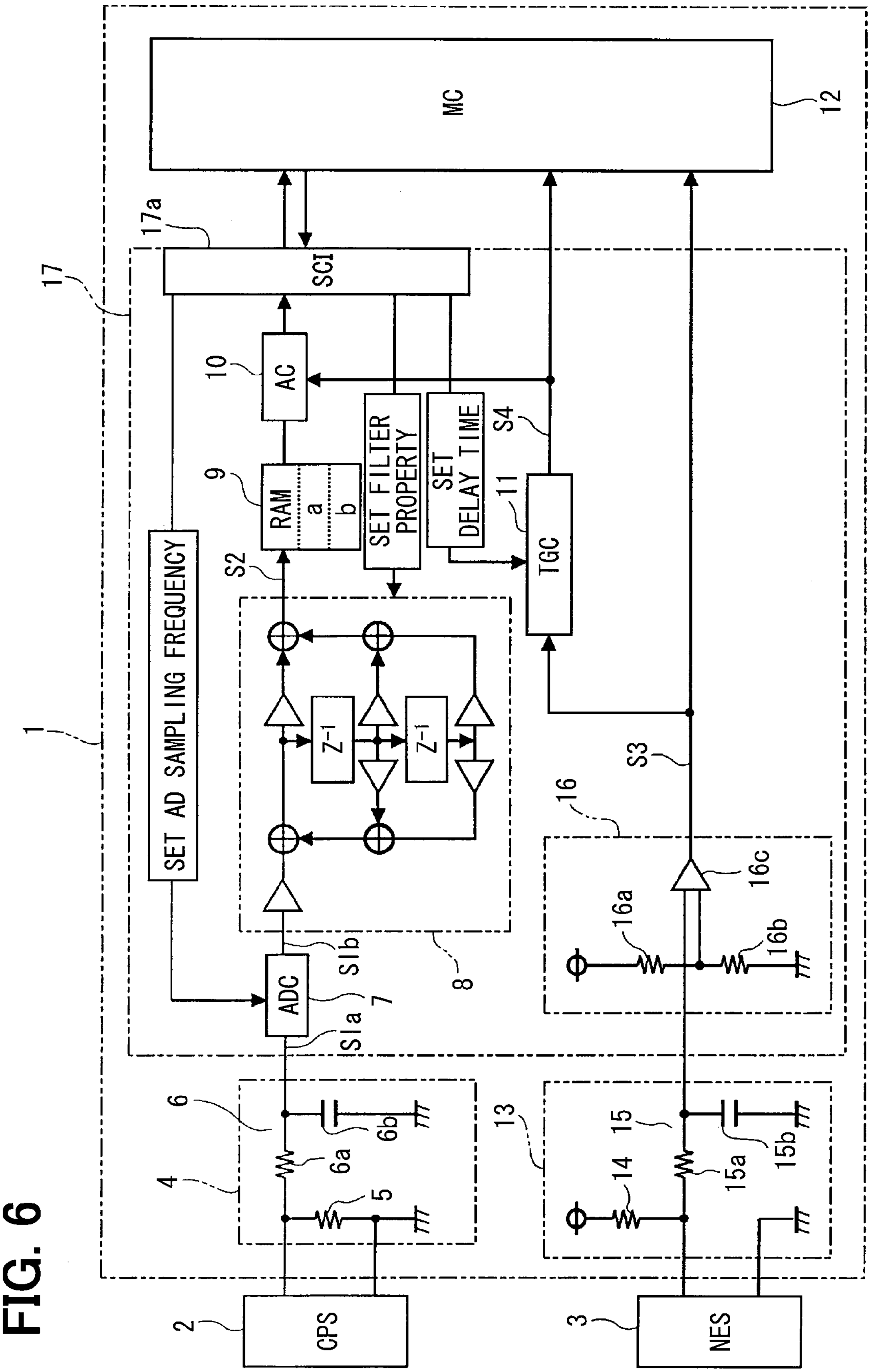
FIG. 6 is a diagram showing a sensor signal processing device according to a second embodiment of the present disclosure.

A sensor signal processing device 1 according to a second embodiment of the present disclosure will be described with reference to FIG. 6. In the present embodiment, the AD conversion circuit 7, the digital filter 8, the RAM 9, the arithmetic circuit 10, the trigger generation circuit 11, and the waveform shaping circuit 16 described in the first embodiment are integrated in a semiconductor integrated circuit 17. The semiconductor integrated circuit 17 includes a serial communication interface (SCI) 17*a* that performs serial communication with the microcomputer 12.

The serial communication interface 17*a* transmits the data value indicating the calculation result of the arithmetic circuit 10 to the microcomputer 12 by serial communication. The serial communication interface 17*a* receives serial signals for setting the AD sampling period of the AD conversion circuit 7, the filter property of the digital filter 8, and the delay time of the trigger generation circuit 11 from the microcomputer 12.

Accordingly, a plurality of circuit configurations can be formed as one chip of the semiconductor integrated circuit 17, and a size of the sensor signal processing device 1 can be reduced. In addition, because a transmission distance of signals can be reduced as a whole, the delay time can be reduced. Furthermore, because the semiconductor integrated circuit 17 includes the serial communication interface 17*a* and the communication with the microcomputer 12 is performed by serial communication, the number of external connection terminals for transmitting and receiving data can be reduced.

(Other Embodiments)

While only the selected exemplary embodiments have been chosen to illustrate the present disclosure, it will be apparent to those skilled in the art from this disclosure that various changes and modifications can be made therein without departing from the scope of the disclosure as defined in the appended claims. Furthermore, the foregoing description of the exemplary embodiments according to the present disclosure is provided for illustration only, and not for the purpose of limiting the disclosure as defined by the appended claims and their equivalents.

In the above-described embodiments, the CPS 2 is described as an example of a sensor. The sensor signal processing device 1 may also be applied to other sensor to process a sensor signal of the sensor. In the above-described embodiments, the digital filter 8 is provided as an example of a filter section. The filter section may also include an analog filter circuit. In this case, an output signal of the analog filter circuit may be converted by an AD conversion section into a digital value with a predetermined sampling period, and the digital value may be stored in the RAM 9.

In the above-described embodiments, the digital filter 8 is described as the second-order filter. The digital filter may also be a high order filter, such as a fourth-order filter and a sixth-order filter. The configuration of the input circuit 4 of the CPS 2 and the input circuit 13 of the NE sensor 3 may be changed from the configurations shown in the drawings. The input circuit 4 and the input circuit 13 may be omitted.

The waveform shaping circuit 16 may have other configuration, or the waveform shaping circuit 16 may be omitted. A method of determining the delay time $T_F$ of the digital filter 8 is not limited to the method described in the above-described embodiments. The delay time $T_F$ may be determined by calculating from a circuit constant. The delay time $I_F$ may also be determined based on a result of measuring an actual delay time. The base of timing setting of the NE waveform and the trigger waveform is not limited to the rising edges and may also be falling edges. In the above-described embodiments, the sampling period of the AD conversion circuit 7 is set to a fixed value, for example, 10 μsec. The sampling period of the AD conversion circuit 7 may be changed appropriately.

In the above-described embodiments, the generation of the trigger waveform rising edge is monitored by carrying out the arithmetic process each 1 μsec. By carrying out the arithmetic process at shorter intervals, the timing of the edge generation can be obtained more accurately. In cases where the data value after the AD conversion has a high linearity, the arithmetic process may be carried out at longer intervals. The semiconductor integrated circuit 17, in which the AD conversion circuit 7, the digital filter 8, the RAM 9, the arithmetic circuit 10, the trigger generation circuit 11 and the waveform shaping circuit 16 are integrated, may also include the microcomputer 12.

The sensor signal processing device 1 may include a timing signal output section that transmits the data acquisition timing signal generated by the timing signal generation section to an external device, and the sensor signal processing device 1 may include a crank signal output section that transmits the signal synchronized with the crank angle to an external device.

What is claimed is:

1. A sensor signal processing device comprising:

an AD conversion section converting an analog signal to a digital signal;

a filter section filtering a signal;

a timing signal generation section generating a signal synchronized with a crank angle of an engine based on a signal indicating the crank angle and generating a data acquisition timing signal by compensating the signal synchronized with the crank angle with a delay time of the filter section; and an arithmetic section acquiring a plurality of sensor signals, which is transmitted from a sensor and converted to the digital signal through the AD conversion section and the filter section, in a term before and after receiving the data acquisition timing signal, and generating a data synchronized with the data acquisition timing signal by arithmetic.

2. The sensor signal processing device according to claim 1, wherein the AD conversion section converts the analog signal to the digital signal at fixed intervals.

3. The sensor signal processing device according to claim 1, wherein the filter section is a digital filter that filters the sensor signal converted to the digital signal by the AD conversion section.

4. The sensor signal processing device according to claim 1, wherein the timing signal generation section includes an addition section that adds the delay time of the filter section to the signal synchronized with the crank angle generated from the signal indicating the crank angle of the engine.

5. The sensor signal processing device according to claim 1, wherein the arithmetic section generates the data synchronized with the data acquisition timing signal by linear interpolation using one sensor signal before receiving the data acquisition timing signal and one sensor signal after receiving the data acquisition timing signal.

6. The sensor signal processing device according to claim 1, wherein the arithmetic section includes a storage section that stores only the sensor signals filtered by the filter section in the term before and after receiving the data acquisition timing signal.

7. The sensor signal processing device according to claim 1, wherein the filter section is configured so that the delay time in a frequency band in which the sensor signal is acquired is constant.

8. The sensor signal processing device according to claim 1, wherein the arithmetic section adds a delay time required for other signal process in addition to the delay time of the filter section.

9. The sensor signal processing device according to claim 1, wherein the filter section is capable of changing a filter property for removing noise.

10. The sensor signal processing device according to claim 1, wherein the arithmetic section is capable of changing a time added to the signal synchronized with the crank angle.

11. The sensor signal processing device according to claim 1, further comprising a waveform shaping section that performs waveform shaping of the signal synchronized with the crank angle.

12. The sensor signal processing device according to claim 1, wherein the AD conversion section is capable of changing a sampling period.

13. The sensor signal processing device according to claim 1, wherein the AD conversion section, the filter section, the timing signal generation section, and the arithmetic section are integrated as a semiconductor integrated circuit.

14. The sensor signal processing device according to claim 1, further comprising a serial communication section that transmits the data generated by the arithmetic section and synchronized with the data acquisition timing signal by serial communication.

15. The sensor signal processing device according to claim 1, further comprising a timing signal output section that transmits the data acquisition timing signal generated by the timing signal generation section to an external device.

16. The sensor signal processing device according to claim 1, further comprising a crank signal output section that transmits the signal synchronized with the crank angle to an external device.

* * * * *